United States Patent [19]

Sannomiya et al.

[11] Patent Number: 5,541,494
[45] Date of Patent: Jul. 30, 1996

[54] MOTOR CONTROL SYSTEM FOR ELECTRIC CARS

[75] Inventors: Teruo Sannomiya, Anjo; Yutaka Hotta, Chiryu, both of Japan

[73] Assignee: AISIN AW CO., LTD., Japan

[21] Appl. No.: 223,965

[22] Filed: Mar. 28, 1994

[30] Foreign Application Priority Data

Mar. 29, 1993 [JP] Japan .................... 5-070585

[51] Int. Cl.⁶ .................................................. H02P 5/34
[52] U.S. Cl. .................... 318/801; 318/811; 318/802; 318/806; 363/40; 363/41; 363/137
[58] Field of Search .................................... 318/811, 801, 318/802, 806; 363/40, 41, 137, 138

[56] References Cited

U.S. PATENT DOCUMENTS

| | | | |
|---|---|---|---|
| 3,710,229 | 1/1973 | Jessee | 363/41 |
| 4,314,189 | 2/1982 | Okado et al. | 318/802 |
| 4,574,340 | 3/1986 | Baker | 363/41 |
| 4,575,668 | 3/1986 | Baker | 318/811 |
| 4,615,000 | 9/1986 | Fuji et al. | 363/41 |

FOREIGN PATENT DOCUMENTS

| | | |
|---|---|---|
| 63-52602 | 3/1988 | Japan . |
| 1-39227 | 2/1989 | Japan . |
| 1129778 | 5/1989 | Japan . |
| 2-79777 | 3/1990 | Japan . |

*Primary Examiner*—William M. Shoop, Jr.
*Assistant Examiner*—Karen Masih
*Attorney, Agent, or Firm*—Lorusso & Loud

[57] ABSTRACT

A motor control system for an electric car includes a detector for determining when an input voltage or an output voltage of a DC power circuit falls below a respective predetermined value to operate a switching signal stopper circuit which interrupts or prevents the application of pulse width modulated (PWM) signals to current control elements switching DC currents to generate three-phase AC currents in coils of the motor. The detection of an abnormal drop in the input voltage or the output voltage indicates a malfunction causing excessive currents which could burn out the control elements and/or the power circuit in the absence of prompt interruption of the PWM switching signals.

9 Claims, 5 Drawing Sheets

|  | $V_{IN}$ (volts) | $+V_{OUTi}$ (volts) | $-V_{OUTi}$ (volts) | $V_{OUTi}$ (volts) |
|---|---|---|---|---|
| Normal Value | 12 | +15 | −15 | 30 |
| IREADY Condition 1 | X=8 | | | Y=24 |
| IREADY Condition 2 | X=8 | | −9 Y=9 | |

FIG. 4

MOTOR CONTROL SYSTEM FOR ELECTRIC CARS

BACKGROUND OF THE INVENTION

1. Field of the Invention

The present invention relates to an electric car and, more particularly, to a motor control system for the electric car.

2. Description of the Related Art

In one prior art electric car, a battery is mounted in the car body as a power source of DC current which is converted into three-phase AC current to drive a motor. The speed of the car is changed by controlling the torque of the motor which is connected to the drive wheels of the car. The motor control unit includes an electronic control unit (ECU) for generating pulse-width modulated (PWM) base drive signals corresponding to the load conditions of the electric car. The PWM base drive signals are applied as switching signals to an inverter bridge.

In the inverter bridge, the PWM base drive signals switch IGBTs and power transistors operating as current control elements to convert the DC current of the battery into three-phase AC currents having U, V and W phases which are fed to the coils of the motor. Typically, the inverter bridge has six IGBTs divided into three pairs or arms which generate the currents in the respective individual phases. One IGBT of each pair is turned ON by pulses which have pulse widths designed to generate a corresponding half-cycle of each phase current while the other IGBT of each pair is held OFF until the succeeding half-cycle when operation of the IGBTs in each pair is reversed. Base drive signal amplifiers are provided for amplifying the PWM base drive signals generated by the ECU and for applying the amplified drive signals to the bases of the IGBTs.

The DC current of the battery, which has a voltage of 12 volts, is input to a base drive power circuit (e.g., DC-DC converter). The DC=DC converter transforms the 12 volt input into an output voltage of 30 volts which is fed to the base drive signal amplifiers.

In the prior art motor control system, the output voltage of the base drive power circuit may drop to disable the turn OFF of one IGBT. If the corresponding other IGBT is then turned ON, the positive and negative sides of the arm are shorted to burn out the paired IGBTs. Still worse, a large reverse current flows through the bases of the two IGBTs to burn out the base drive power circuit.

Additionally, the transformer of the base drive power circuit has power elements such as FETs on its primary side. If the input voltage of the base drive power circuit drops, the current flow into the power elements increases at an abnormal rate to maintain the output voltage. This current flow increases burn out of the base drive power circuit.

SUMMARY OF THE INVENTION

It is, therefore, an object of the present invention to solve the above-specified problems concomitant with the prior art motor control systems for electric cars and to provide a motor control system for an electric car which prevents short-circuiting the positive and negative sides of the DC and AC inverter arms so that a malfunction will not burn out the IGBTs and the base drive power circuit.

According to one aspect of the present invention, there is provided a motor control system for an electric car having a switching signal stopper circuit which responds to a detected power circuit voltage being less than a predetermined value to interrupt or prevent switching signals being applied to current control elements forming arms of an inverter bridge controlling the currents in the coils of the motor. The power circuit energizes amplifiers for amplifying the switching signals applied to the current control elements. Detecting an abnormal drop in the power circuit voltage to interrupt the switching signals prevents burn out of current control elements and the power circuit from a malfunction of the system.

According to another aspect of the present invention, a detector detects the output voltage of the power circuit so that the switching signals are stopped when the detected output voltage is less than the predetermined value.

Thus, according to said another aspect of the present invention, if any malfunction drops the output voltage of the power circuit to a lower level than the predetermined value so that the current control elements cannot be turned OFF, the switching is stopped by detecting the reduction of the output voltage. As a result, the positive and negative sides of the inverter arms can be prevented from being shorted, so that the current control elements will not be burned out. Moreover, no large reverse current flows through the current control elements so that the power circuit will not be burned out.

According to still another aspect of the present invention, a detector detects the input voltage of the power circuit so that the switching signals are stopped when the input voltage is less than the predetermined value.

According to said still another aspect of the present invention, if any malfunction drops the input voltage of the power circuit, the switching is stopped. As a result, the current flow into the power elements of the power circuit does not increase abnormally in an attempt to maintain output voltage and burnout of the power circuit is prevented.

BRIEF DESCRIPTION OF THE DRAWINGS

FIG. 4 is a chart enumerating IREADY conditions; and

DESCRIPTION OF THE PREFERRED EMBODIMENT the present invention is described in detail in connection with one embodiment illustrated in the accompanying drawings.

Figure 1:
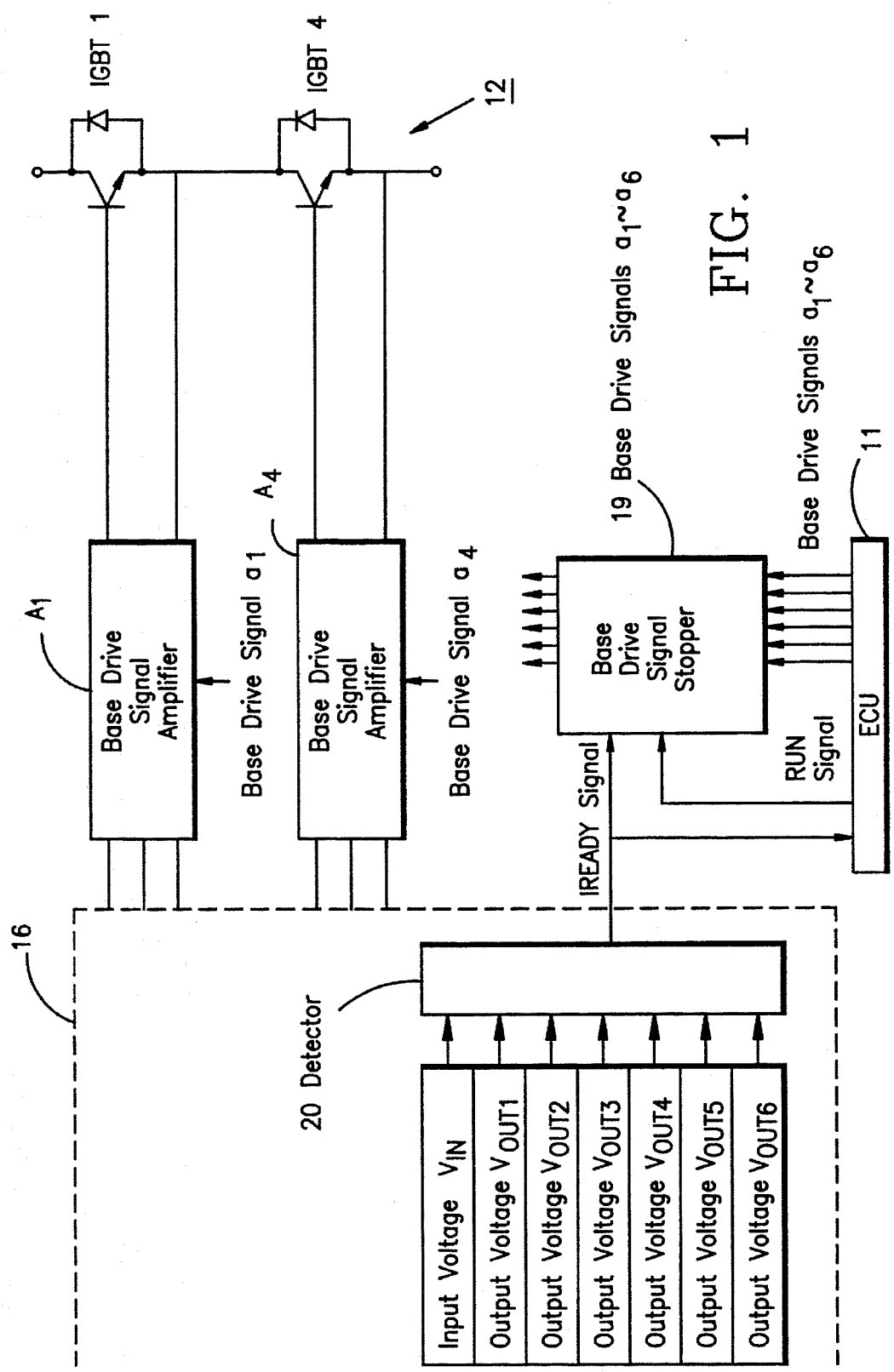
FIG. 1 is a block diagram showing a motor control system for an electric motor according to an embodiment of the present invention.
Figure 2:
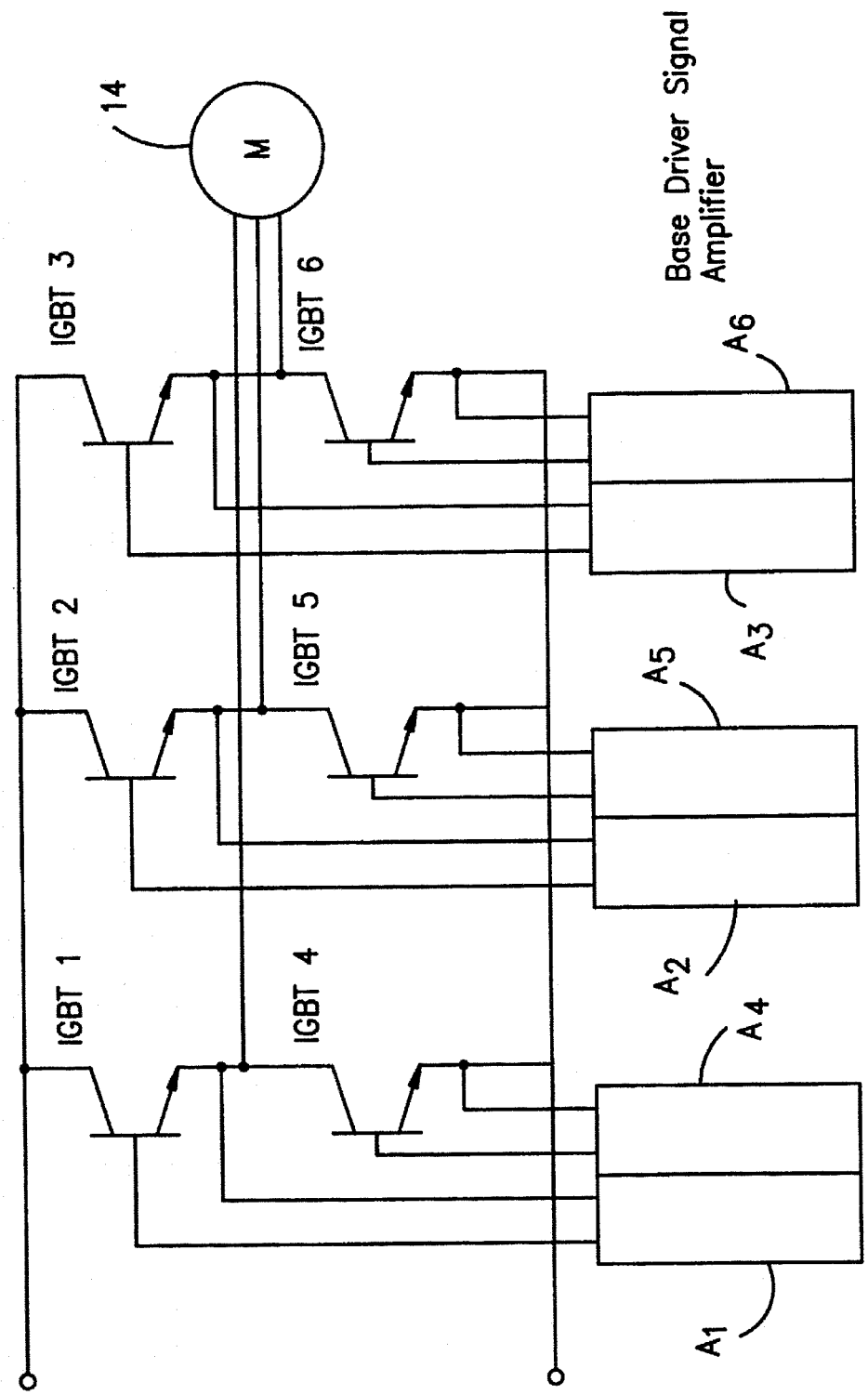
FIG. 2 is a circuit diagram showing an inverter bridge of the embodiment of the present invention.

In FIGS. 1 and 2, reference numeral 11 designates an ECU acting as a part of the motor control system to generate pulse width modulated base drive signals, $a_1$ to $a_6$ as switching signals corresponding to load conditions of the electric car. Numeral 12 designates an inverter bridge having six current control elements IGBT 1 to IGBT 6 having bases to which are fed the respective PWM base drive signals $a_1$ to $a_6$ as switching signals.

The inverter 12 is connected with a battery (not shown) acting as a power source. The IGBTs 1–6 are switched in response to the PWM base drive signals $a_1$ to $a_6$, respectively, to convert the DC current of the battery into three-phase AC currents having U,V and W phases which are fed to the coils (not shown) of a motor 14.

IGBT 1 and IGBT 4 form a first pair, IGBT 2 and IGBT 5 form a second pair, and IGBT 3 and IGBT 6 form a third pair. The first, second and third pairs form three arms, which are connected in parallel across the battery. Base drive signal amplifiers $A_1$ to $A_6$ are connected to the bases and emitters of the respective IGBTs 1 to 6. These base drive signal amplifiers $A_1$ to $A_6$ receive and amplify the base drive signals $a_1$ to $a_6$ generated by the ECU 11 and apply the base drive signals to the bases of the respective IGBTs 1 to 6.

In order that the base drive signal amplifiers $A_1$ to $A_6$ may switch the IGBTs 1 to 6 with the base drive signals $a_1$ to $a_6$, the signals $a_1$ to $a_6$ have to have predetermined magnitudes. Specifically, a higher switching voltage than a reference voltage is necessary for turning ON the IGBTs 1 to 6, and a lower switching voltage is necessary for turning OFF the IGBTs.

Figure 3:
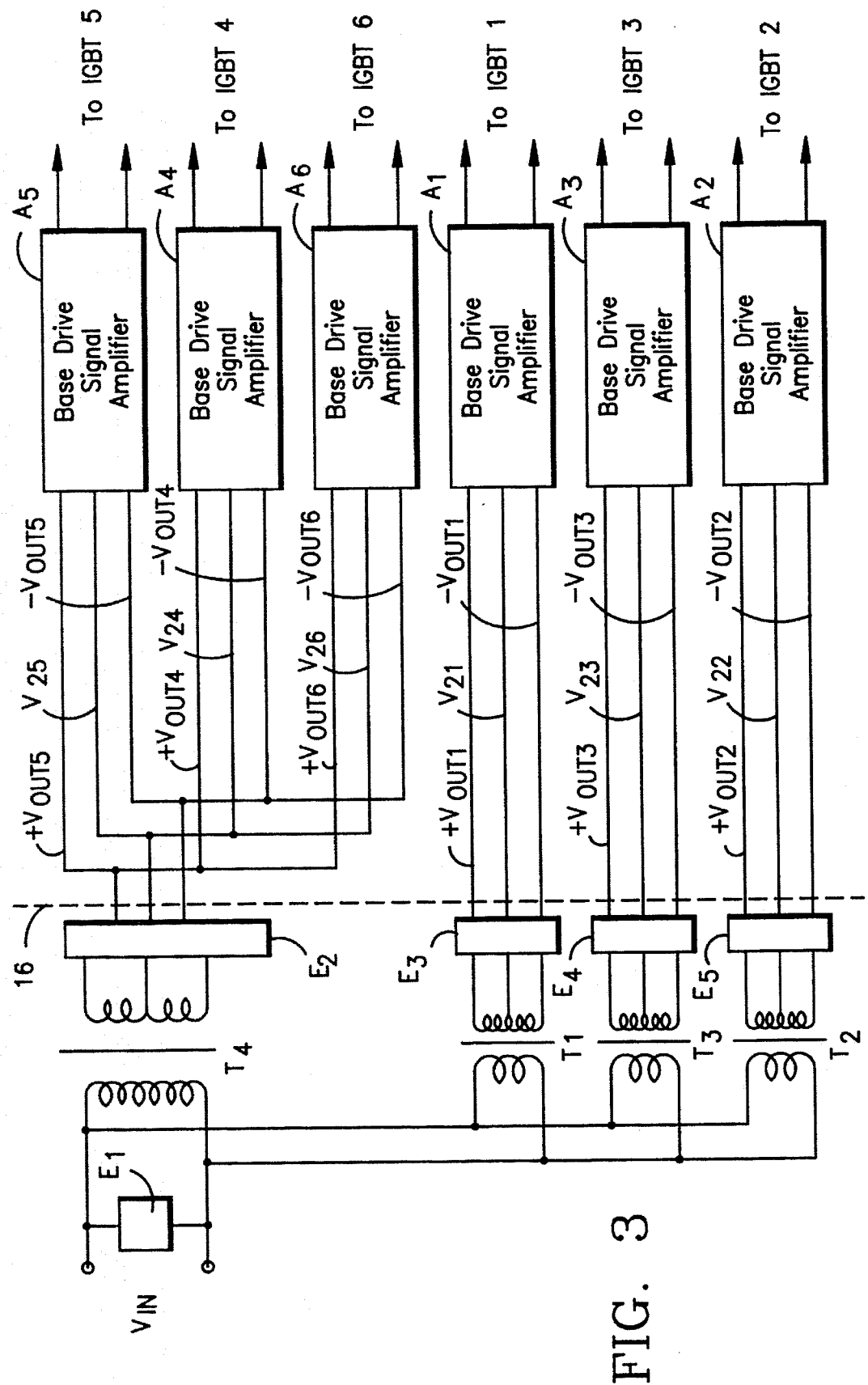
FIG. 3 is a circuit diagram showing a detector of the embodiment of the present invention.

A base drive power circuit 16, FIG. 3, provides the necessary switching voltages. This power circuit 16 receives an input voltage $V_{IN}$ and feeds the individual base drive signal amplifiers $A_1$ to $A_6$ with output voltages $+V_{OUT1}$ and $+V_{OUT6}$ for turning ON the IGBTs 1 to 6, switching voltages of $-V_{OUT1}$ to $-V_{OUT6}$ for turning OFF the IGBTs 1 to 6, and reference voltages $V_{B1}$ to $V_{B6}$.

For generating these voltages, the base drive power circuit 16 has transformers $T_1$ to $T_6$, which are fed on their primary sides with the input voltage $V_{IN}$ and generate the output voltages $+V_{OUT1}$ to $+V_{OUT6}$, $-V_{OUT1}$ to $-V_{OUT6}$ and $V_{B1}$ to $V_{B6}$ on their secondary sides, IGBT 4, IGBT 5 and IGBT 6 are located on the negative sides of the arms and commonly have their emitter voltages at zero volts. So the output voltages $V_{B4}$, $V_{B5}$ and $V_{B6}$ can be commonly set to zero volts. As a result, the transformer $T_6$ is shared by the base drive signal amplifiers $A_6$ to $A_6$. IGBT 1, IGBT 2 and IGBT 3 are located on the positive side of the arms and have emitter voltages which vary according to the timing. So output voltages $V_{B1}$, $V_{B2}$ and $V_{B3}$ are isolated from each other to permit the respective variable emitter voltages of IGBT 1, IGBT 2 and IGBT 3. Thus, three transformers $T_1$, $T_2$ and $T_3$ are provided for the base drive signal amplifiers $A_1$, $A_2$ and $A_3$, respectively.

If, for example, a malfunction raises the negative output voltage $-V_{OUT1}$ of the base driving power circuit 16 so that the IGBT 1 cannot be turned OFF before the IGBT 4 is turned ON, the arm has its positive and negative sides shorted through IGBT 1 and IGBT 4 to burn out IGBT 1 and IGBT 4. Moreover, a large reverse current flows through the bases of the IGBT 1 and IGBT 4 to the base driving power circuit 16 to burn out the circuit 16.

The transformers $T_1$ to $T_4$ of the base drive power circuit 16 include additional conventional elements such as FETs (not shown on their primary sides. If a malfunction drops the input voltage $V_{IN}$ to the base drive power circuit 16, the current flow into the power elements increases abnormally to maintain the output voltages $+V_{OUT1}$ to $+V_{OUT6}$ and $-V_{OUT1}$ to $-V_{OUT6}$ resulting in burn out of the base drive power circuit 16.

To prevent burn out of the base drive power circuit 16 and the IGBTs 1 to 6, the input voltage $V_{IN}$ of the base drive power circuit 16 and the output voltages $+V_{OUT1}$ to $+V_{OUT6}$, $-V_{OUT1}$ to $-_{OUT6}$ and $V_{B1}$ to $V_{B6}$ of the base drive power circuit 16 are detected. If the detected voltages fail to satisfy predetermined conditions, the base driving signal amplifiers $A_1$ to $A_6$ stop the switching operations by terminating the base drive signals $a_1$ to $a_6$. A base drive signal stopper 19, FIG. 1, is connected between the ECU 11 and the individual base drive signal amplifiers $A_1$ to $A_6$. The base drive power circuit 16 includes a detector 20. The detector 20 includes a sensor $E_1$, FIG. 3, which is connected to the primary sides of the respective transformers $T_1$ to $T_4$, and sensors $E_2$, $E_3$, $E_4$ and $E_5$ which are connected to the secondary sides of the respective transformers $T_1$ to $T_6$. The sensor $E_1$ detects the input voltage $V_{IN}$; the sensor $E_2$ detects the output voltages $+V_{OUT4}$ ($+V_{OUT5}$ and $+V_{OUT6}$ are the same as $+V_{OUT4}$), $-V_{OUT6}$ ($-V_{OUT5}$ and $V_{OUT6}$ are the same as $-V_{OUT4}$), and $V_{B4}$ ($V_{B5}$ and $V_{B6}$ are the same as $V_{B4}$); the sensor $E_2$ detects the output voltages $+V_{OUT1}$, $-V_{OUT1}$ and $V_{B1}$; and the sensor $E_6$ detects the output voltages $+V_{OUT5}$, $-V_{OUT5}$ and $V_{B2}$; and the sensor $E_5$ detects the output voltages $+V_{OUT2}$, $-V_{OUT3}$ and $V_{B3}$.

Each pair of output voltages, for example $+V_{OUT1}$ and $-V_{OUT1}$, can be determined by a single output voltage $V_{OUT1}$ which is the difference of the voltages of the pair of output voltages, for example:

$$V_{OUT1} = +V_{OUT1} - (-V_{OUT5})$$

The detector 20 determines if the input voltage $V_{IN}$ exceeds a predetermined value X and determines if the output voltage $V_{OUT1}$ exceeds a predetermined value Y. If the input voltage $V_{IN}$ exceeds the predetermined value X and if the output voltages $V_{OUT1}$ to $V_{OUT6}$ all exceed the predetermined value Y, the detector 20 outputs the IREADY signal to the ECU 11 and the base drive signal stopper 19.

The controls operate differently for operations before and after the switching is started. Specifically, before the switching is started, the software in the ECU 11 determines if the switching is to be started. It is determined by the ECU 11 for a constant period if the input IREADY signal is high or low. The RUN signal is output to the base drive signal stopper 19, if the IREADY signal is high, and the FAIL signal is output if the IREADY signal is low.

The base drive signal stopper 19 is equipped with an AND gate (not shown) for determining when both the IREADY signal and RUN signal are present. If these two signals are both detected, a high level signal is output and the AND gate so that the base drive signals $a_1$ to $a_6$ are transferred from the ECU 11 to the base drive signal amplifiers $A_1$ to $A_6$, respectively.

In response to the base drive signals $a_1$ to $a_6$ from the base drive signal stopper 19, the individual base drive signal amplifiers $A_1$ to $A_6$ amplify the signals $a_1$ to $a_6$ to the appropriate output voltage $+V_{OUTi}$, $-V_{OUTi}$ and $V_{Bi}$ (i=1, 2, 3, 4, 5 and 6). The amplified signals are fed to the bases of the IGBTs 1 to 6 as positive switching voltages for turning ON the IGBTs 1 to 6 and as negative switching voltages for turning OFF the IGBTs 1 to 6.

In this manner, the switching of the IGBTs 1 to 6 is started. The frequency of the switching by the signals $a_1$ to $a_6$ is remarkably high. Because the software in the ECU 11 is relatively slow in determining whether or not the switching should be continued, IGBTs 1 to 6 could have their positive and negative sides shorted and could be burnt out if the ECU was the sole control for stopping the switching signals $a_1$ to $a_6$.

Therefore, after the switching has been started, the base drive signals $a_1$ and $a_6$ are respectively transferred to the base drive signal amplifiers $A_1$ to $A_6$ by the base drive signal stopper 19, while both the IREADY signal and the RUN signal enable the AND gate of the base drive signal stopper 19. Thus, the transfer of the base drive signals $a_1$ to $a_6$ can be stopped quickly when a malfunction causes IREADY to go low to disable the AND gate in the base drive signal stopper 19 to turn OFF the IGBTs 1 to 6.

If the input voltage $V_{IN}$ has a normal value of 12 volts and if the output voltages $+V_{OUT1}$ and $-V_{OUT1}$ have respective normal values of +15 volts and −15 volts, as shown in FIG. 4, the output voltage $V_{OUT1}$ is calculated by:

$$\begin{aligned} V_{OUT1} &= +V_{OUT1} - (-V_{OUT1}) \\ &= +15 - (-15) \\ &= 30 \text{ volts.} \end{aligned}$$

If eight volts is the minimum input voltage $V_{IN}$ for preventing burnout of the power elements disposed on the primary side of the transformers $T_1$ to $T_6$, the predetermined value X takes the following value, as indicated by the IREADY condition 1:

X=8 volts

Moreover, if minus nine volts (−9 v) is the minimum negative output voltage $-V_{OUT1}$ necessary for turning OFF the IGBTs 1 to 6, the minimum output voltage $V_{OUT1}$ for switching the individual IGBTs 1 to 6 without fail is calculated as follows:

$$\begin{aligned} V_{OUT1} &= +15 - (-9) \\ &= 24 \text{ volts} \end{aligned}$$

Hence, the predetermined value Y under $V_{OUT1}$ in FIG. 4 is 24 volts, as indicated by the IREADY condition 1.

Incidentally, the output voltage $-V_{OUT1}$ takes the following value to turn OFF the corresponding IGBT 1 to IGBT 6:

$-V_{OUT1} = -9$ volts

Thus, the predetermined value Y takes the following value, as indicated by the IREADY condition 2:

Y=9 volts

If any trouble raises the negative output $-V_{OUT1}$ of the base driving power circuit 16 so that the IGBTs 1 to 6 cannot be turned OFF, the switching is stopped. This prevents the positive and negative sides of the arms from being shorted and keeps the IGBTs 1 to 6 from burning out. Moreover, no large reverse current flows to the base drive power circuit 16 through the bases of the IGBTs 1 to 6 so that the base drive power circuit 16 is not burned out.

Moreover, if any malfunction drops the input voltage $V_{IN}$ of the base driving power circuit 16 below X, the switching is stopped. As a result, abnormal increase of the current flow into the power elements is prevented even if the output voltages $+V_{OUT1}$ and $-V_{OUT1}$ are maintained, so that the base drive power circuit 16 is not burned out.

Figure 5:
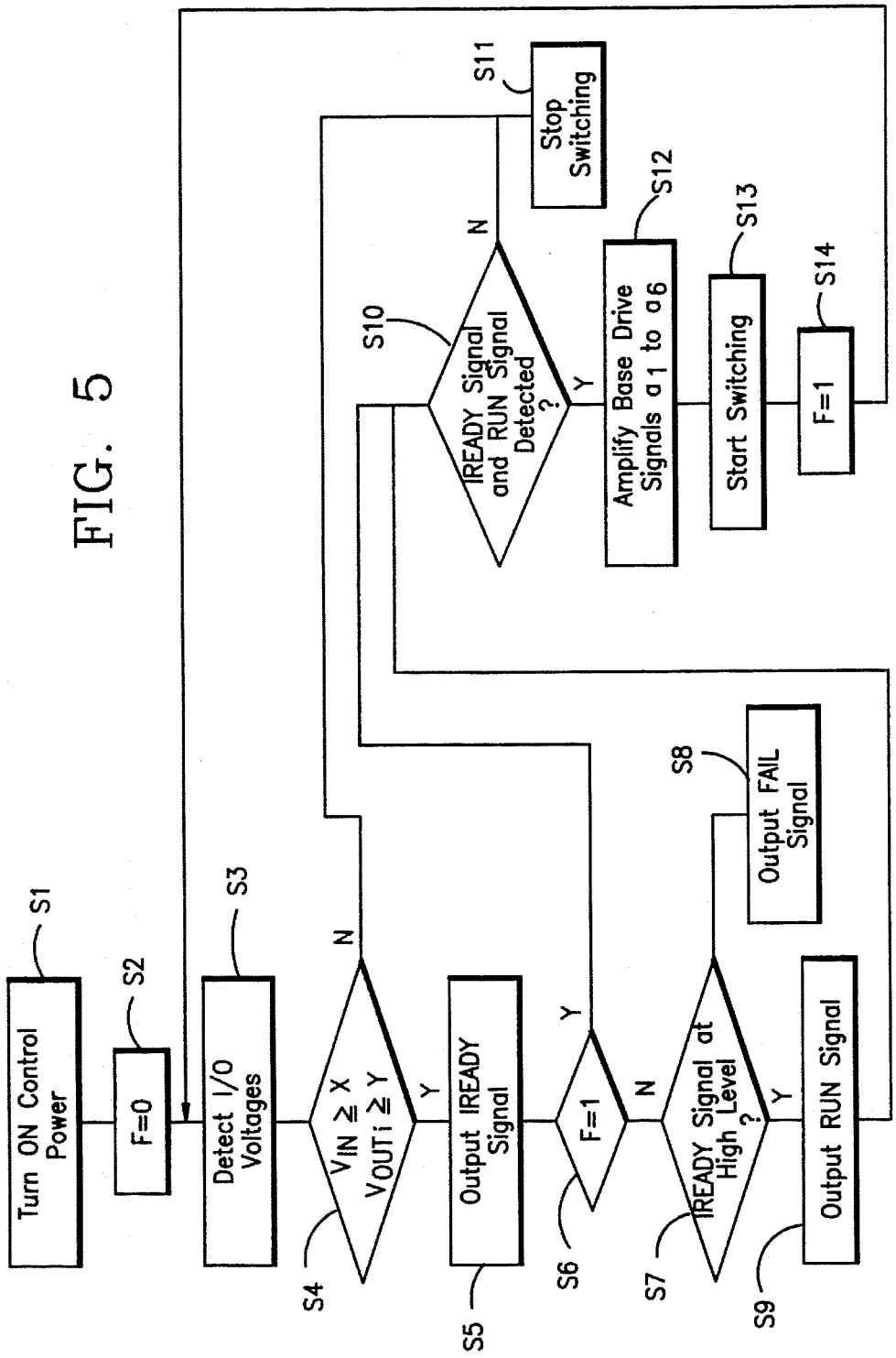
FIG. 5 is a flow chart showing operation of the motor control system for an electric motor according to the embodiment of the present invention.

The flow chart of FIG. 5 illustrates the operation of the present motor control system.

Step S1: The power to the base drive power circuit 16 is turned ON.

Step S2: A flag is set to 0 to indicate that the system is not presently switching IGBTs.

Step S3: the input voltage $V_{IN}$ is detected, and the output voltage $V_{OUT1}$ is detected on the basis of the output voltages $+V_{OUT1}$, $-V_{OUT1}$ and $V_{B1}$.

Step S4: If it is determined whether or not the input voltage $V_{IN}$ exceeds the predetermined value X (i.e. $V_{IN} \geq X$) and whether or not the $V_{OUT1}$ exceeds the predetermined value Y (i.e., $V_{OUT1} \geq Y$). If the input voltage $V_{IN}$ exceeds the predetermined value X and if the output voltage $V_{OUT1}$ exceeds the predetermined value Y, the routing advances to Step S5. If the input voltage $V_{IN}$ is lower than the predetermined value X or if the output voltage $V_{OUT1}$ is lower than the predetermined value Y, the system branches to Step S11.

Step S5: the detector 20 output the IREADY signal.

Step S6: It is determined whether or not the flat is 1. The routine advances to Step S10 if the flag is 1 but to Step S7 if the flag is 0.

Step S7: The ECU 11 determines whether or not the IREADY signal is high. The routine advances to Step S9 if IREADY is high but to Step S8 if IREADY is low.

Step S8: The FAIL signal is output.

Step S9: The RUN signal is output.

Step S10: The base drive signal stopper 19 determines whether or not the IREADY signal and the RUN signal have been detected. The routine advances to Step S12 if both the IREADY signal and the RUN signal are detected, but to Step S11 if either one is not detected.

Step S11: The switching is stopped.

Step S12: the base drive signal amplifiers $A_1$ to $A_6$ amplify the base drive signals $a_1$ to $a_6$.

Step S13: The switching is started.

Step S14: The flag is set to 1.

The present invention is not limited to the embodiment described above since the described embodiment can be modified in various manners without departing from the scope and spirit of the invention.

What is claimed is:

1. A motor control system for an electric car, comprising:
  (a) an inverter bridge including a plurality of arms each having a pair of current control elements for supplying alternating current to a motor;
  (b) switching signal generating means for generating switching signals for the individual current control elements of said inverter bridge;
  (c) an amplifier for amplifying said switching signals generated by said switching signal generating means and for applying the amplified switching signals to the corresponding current control elements;
  (d) a power circuit for converting an input voltage from a power source into an output voltage and supplying said output voltage to said amplifier;
  (e) detector means for detecting said output voltage supplied by said power circuit to said amplifier; and
  (f) said switching signal generating means including determining means responsive to said detected output voltage being less than a predetermined value for preventing the switching of the current control elements.

2. A motor control circuit according to claim 1 wherein the current control elements are IGBT elements and the switching signal generating means generates PWM switching signals for turning ON and turning OFF the respective IGBT elements.

3. A motor control circuit according to claim 1, wherein the power circuit is a DC to DC converter.

4. A motor control system for an electric car, comprising:
  (a) an inverter bridge including a plurality of arms each having a pair of current control elements for supplying alternating current to a motor;
  (b) switching signal generating means for generating switching signals for the individual current control elements of said inverter bridge;

(c) an amplifier for amplifying said switching signals generated by said switching signal generating means and for applying the amplified switching signals to the corresponding current control elements;

(d) a power circuit for converting an input voltage from a power source into an output voltage and supplying said output voltage to said amplifier;

(e) detector means for detecting said input voltage to said power circuit; and (f) said switching signal generating means including determining means responsive to said detected input voltage being less than a predetermined value for preventing the switching of the current control elements.

5. A motor control circuit according to claim 4 wherein the current control elements are IGBT elements and the switching signal generating means generates PWM switching signals for turning ON and turning OFF the respective IGBT elements.

6. A motor control circuit according to claim 4 wherein the power circuit is a DC to DC converter.

7. A motor control system for an electric car, comprising:

(a) an inverter bridge including a plurality of arms each having a pair of current control elements for supplying alternating current to a motor;

(b) switching signal generating means for generating switching signals for the individual current control elements of said inverter bridge;

(c) an amplifier for amplifying said switching signals generated by said switching signal generating means and for applying the amplified switching signals to the corresponding current control elements;

(d) a power circuit for converting an input voltage from a power source into an output voltage and for supplying said output voltage to said amplifier;

(e) first detector means for detecting said output voltage supplied by said power circuit to said amplifier; and (f) second detector means for detecting said input voltage to said power circuit;

(f) said switching signal generating means including determining means responsive to said detected output voltage being less than a first predetermined value and responsive to said detected input voltage being less than a second predetermined value for preventing the switching of the current control elements.

8. A motor control circuit according to claim 7 wherein the current control elements are IGBT elements and the switching signal generating means generates PWM switching signals for turning ON and turning OFF the respective IGBT elements.

9. A motor control circuit according to claim 7 wherein the power circuit is a DC to DC converter.

* * * * *

UNITED STATES PATENT AND TRADEMARK OFFICE
CERTIFICATE OF CORRECTION

PATENT NO. : 5,541,494    Page 1 of 3
DATED : July 30, 1996
INVENTOR(S) : SANNOMIYA et al It is certified that error appears in the above-indentified patent and that said Letters Patent is hereby corrected as shown below:

Col. 1, line 39, "DC=DC" should read --DC-DC--.

Col. 2, line 57, "the" should read --The--.

Col. 3, line 29, "$V_{B1}$ to $V_{B6}$" should read --$V_{Z1}$ to $V_{Z6}$--;
    line 33, "$V_{B1}$" should read --$V_{Z1}$--;
    line 34, "$V_{B6}$" should read --$V_{Z6}$--;
    line 37, "$V_{B4}$, $V_{B5}$ and $V_{B6}$" should read --$V_{Z4}$, $V_{Z5}$ and $V_{Z6}$--;
    line 39, "$A_6$" first instance, should read --$A_4$--;
    line 42, "$V_{B1}$, $V_{B2}$ and $V_{B3}$" should read --$V_{Z1}$, $V_{Z2}$ and $V_{Z3}$--;
    line 57, "(not shown" should read --(not shown)--;
    line 67, "$V_{B1}$ to $V_{B6}$" should read --$V_{Z1}$ to $V_{Z6}$--.

Col. 4, line 11, "$T_6$" should read --$T_4$--;
    line 14, "-$V_{OUT6}$ (-$V_{OUT5}$ and $V_{OUT6}$" should read -- -$V_{OUT4}$ (-$V_{OUT5}$ and -$V_{OUT6}$--;
    line 15, "$V_{B4}$($V_{B5}$ and $V_{B6}$" should read -- -$V_{Z4}$ ( $V_{Z5}$ and $V_{Z6}$--; and "$V_{B4}$)," should read --$V_{Z4}$-- and "$E_2$" should read --$E_3$--;

UNITED STATES PATENT AND TRADEMARK OFFICE
CERTIFICATE OF CORRECTION

PATENT NO. : 5,541,494  Page 2 of 3
DATED : July 30, 1996
INVENTOR(S) : SANNOMIYA et al It is certified that error appears in the above-indentified patent and that said Letters Patent is hereby corrected as shown below:

line 16, "$V_{B1}$" should read --$V_{Z1}$--;

line 17, "$E_6$" should read --$E_4$--; "$V_{OUT5}, -V_{OUT5}$" should read --+$V_{OUT3}, -V_{OUT3}$-- line 18, "$V_{B2}$." should read --$V_{Z3}$-- line 19, "-$V_{OUT3}$ and $V_{B3}$" should read -- -$V_{OUT2}$ and $V_{Z2}$--;

line 25, "-(-$V_{OUT5}$) should read -- -(-$V_{OUT1}$)--;

line 30, "$V_{OUT6}$" should read --$V_{OUT4}$--;

line 43, after "and" insert --the--;

line 44, delete "and" insert --from--;

line 51, "$V_{Bi}$" should read --$V_{Zi}$--; and line 65, delete "and" insert --to--.

UNITED STATES PATENT AND TRADEMARK OFFICE
CERTIFICATE OF CORRECTION

PATENT NO. : 5,541,494
DATED : July 30, 1996
INVENTOR(S) : SANNOMIYA et al

It is certified that error appears in the above-indentified patent and that said Letters Patent is hereby corrected as shown below:

Col. 5, line 17, "$T_6$" should read --$T_4$--;
      line 65, "$V_{B1}$" should read --$V_{Z1}$--; and
      line 66, delete "If it" and insert --It--.

Col. 6, line 4, "routing" should read --routine--.

Signed and Sealed this

Twenty-ninth Day of April, 1997

Attest:

BRUCE LEHMAN

Attesting Officer     Commissioner of Patents and Trademarks